United States Patent
Kim et al.

(10) Patent No.: US 11,817,002 B2
(45) Date of Patent: Nov. 14, 2023

(54) HARMONICS LEARNING SYSTEM AND METHOD

(71) Applicant: Juice Co., Ltd., Seoul (KR)

(72) Inventors: Jun Ho Kim, Seoul (KR); Jong Won Park, Guri-si (KR); Dong Sam Kim, Seoul (KR)

(73) Assignee: Juice Co., Ltd., Seoul (KR)

( * ) Notice: Subject to any disclaimer, the term of this patent is extended or adjusted under 35 U.S.C. 154(b) by 0 days.

(21) Appl. No.: 17/800,918

(22) PCT Filed: Feb. 18, 2021

(86) PCT No.: PCT/KR2021/002057
§ 371 (c)(1),
(2) Date: Aug. 19, 2022

(87) PCT Pub. No.: WO2021/167363
PCT Pub. Date: Aug. 26, 2021

(65) Prior Publication Data
US 2023/0072044 A1    Mar. 9, 2023

(30) Foreign Application Priority Data
Feb. 19, 2020    (KR) .................. 10-2020-0020373

(51) Int. Cl.
*G09B 15/00*    (2006.01)
(52) U.S. Cl.
CPC .................. *G09B 15/002* (2013.01)
(58) Field of Classification Search
CPC .................................................. G09B 15/002
See application file for complete search history.

(56) References Cited

U.S. PATENT DOCUMENTS

| | | | | |
|---|---|---|---|---|
| 2019/0139437 A1* | 5/2019 | Goren | ...................... | G10H 1/38 |
| 2023/0072044 A1* | 3/2023 | Kim | ...................... | G09B 15/001 |

FOREIGN PATENT DOCUMENTS

| | | | | |
|---|---|---|---|---|
| CN | 111681631 A * | 9/2020 | ........... | G06F 16/683 |
| EP | 1898320 | 3/2008 | | |
| JP | 2005-156951 | 6/2005 | | |
| JP | 2005156951 A * | 6/2005 | | |
| JP | 2010-230854 | 10/2010 | | |
| JP | 2012-173722 | 9/2012 | | |
| KR | 10-1900020 | 9/2018 | | |
| KR | 101900020 B1 * | 9/2018 | | |
| KR | 20220001109 A * | 1/2022 | | |

OTHER PUBLICATIONS

International Search Report and the Written Opinion dated Jul. 19, 2021 From the International Searching Authority Re. Application No. PCT/KR2021/002057 and Its Translation of Search Report Into English. (9 Pages).

* cited by examiner

*Primary Examiner* — Robert W Horn

(57) ABSTRACT

According to one embodiment, provided is a harmonics learning system comprising: a communication unit for providing, to a user terminal, sheet music of at least one first voice part, and receiving, from the user terminal, sheet music of at least one second voice part that excludes the first voice part; a model generation unit for generating a scoring model by using a plurality of rules divided into vertical elements and horizontal elements; and a control unit for marking harmonic scores with the sheet music of the first voice part and the sheet music of the second voice part by using the scoring model.

9 Claims, 8 Drawing Sheets

FIG. 3

| vertical element | explanation | horizontal element | explanation |
|---|---|---|---|
| rule 1-1 | diapason rule | rule 2-1 | common rule |
| rule 1-2 | position rule | rule 2-2 | melody rule |
| rule 1-3 | voice-cross rule | rule 2-3 | stepwise rule |
| ⋮ | ⋮ | ⋮ | ⋮ |
| rule 1-n | overlapping rule | rule 2-4 | peak rule |

FIG. 4

| vertical element | explanation | horizontal element | explanation |
|---|---|---|---|
| rule 1-1 | diapason rule | rule 2-1 | common rule |
| rule 1-2 | position rule | rule 2-2 | melody rule |
| rule 1-3 | voice-cross rule | rule 2-3 | stepwise rule |
| ⋮ | ⋮ | ⋮ | ⋮ |
| rule 1-n | overlapping rule | rule 2-4 | peak rule |
| total number of rules (n+m) | | 15 | |
| level of scoring model | | beginner · intermediate · advanced | |

FIG. 7

| vertical element | score | horizontal element | score |
|---|---|---|---|
| rule 1-1 | a | rule 2-1 | a |
| rule 1-2 | b | rule 2-2 | b |
| rule 1-3 | c | rule 2-3 | c |
| ⋮ | ⋮ | ⋮ | ⋮ |
| rule 1-n | b | rule 2-m | b |
| total score | | 40 | |

HARMONICS LEARNING SYSTEM AND METHOD

RELATED APPLICATIONS

This application is a National Phase of PCT Patent Application No. PCT/KR2021/002057 having International filing date of Feb. 18, 2021, which claims the benefit of priority of Korean Patent Application No. 10-2020-0020373 filed on Feb. 19, 2020. The contents of the above applications are all incorporated by reference as if fully set forth herein in their entirety.

FIELD AND BACKGROUND OF THE INVENTION

An embodiment of the present invention relates to harmonics learning system and method.

Harmony is the temporal flow of sound created by successive chords in music. Harmonics, which relates to the method of sequencing chords, is the fundamental theory of musicology along with counterpoint. In other words, harmonics relates to the horizontal and vertical structures of music such as tonality, scale, chord, and harmonic progression or cadence, and is a study on the integration of tendencies in Western classical music.

In the field of domestic and foreign music education, in general, chord learning is practically performed through sheet music analysis in the form of a four-voice chorus. A four-voice chorus is a music format consisting of four voice parts (SATB): soprano, alto, tenor, and bass. The four-voice choir is based on medieval church music and follows very strict rules, and well represents the concepts of tonality, scale, chord, and harmonic progression and cadence, so it is widely used in the course of harmonics education. Here, the task of presenting one voice part and completing the other three voice parts is mainly being performed. For example, there is a principle that determines which harmony or melody can be processed even in the task of presenting a bass voice part and completing voices. Therefore, there are some rules even for works that seem free and creative at first glance, so researches on automating this process are being conducted.

However, sheet music generation technologies using the existing sheet music as an input include the exceptional example that the existing sheet music does not follow exact harmonic rules, so it is difficult to generate sheet music for harmonics education.

SUMMARY OF THE INVENTION

An object of the present invention is to provide harmonics learning system and method capable of learning harmonics through mutual communication between a user and a system.

In addition, an object of the present invention is to provide harmonics learning system and method capable of generating an evaluation model for harmonics learning through a machine learning method.

According to an embodiment, a harmonics learning system including a communication unit that provides a user terminal with sheet music of at least one first voice part, and receives from the user terminal sheet music of at least one second voice part that excludes the first voice part; a model generation unit that generates a scoring model by using a plurality of rules divided into a vertical element and a horizontal element; and a control unit that marks a harmonic score with the sheet music of the first voice part and the sheet music of the second voice part by using the scoring model is provided.

The level of the scoring model may be classified according to a number of included rules.

The vertical element may include at least one of a diapason rule, a position rule, a voice-cross rule, and an overlapping rule.

The horizontal element may include a common rule and a melody rule. In addition, the melody rule may include at least one of a stepwise rule, a skip rule, an active-tone rule, and a peak rule.

The model generation unit may generate the scoring model through reinforcement learning using the rules.

The model generation unit may perform repetitive learning so that a total sum of scores given according to the rules is a maximum.

According to an embodiment, a method for learning harmonics, including the steps of providing, by a communication unit, sheet music of at least one first voice part to a user terminal; receiving, by the communication unit, sheet music of at least one second voice part that excludes the first voice part from the user terminal; generating a scoring model by using a plurality of rules divided into a vertical element and a horizontal element by a model generation unit; and marking a harmonic score with the sheet music of the first voice part and the sheet music of the second voice part by using the scoring model is provided.

In the step of generating the scoring model, the scoring model may be generated through reinforcement learning using the rules.

In the step of generating the scoring model, the scoring model may be generated by performing repetitive learning so that a total sum of scores given according to the rules is a maximum.

The harmonics learning system and method according to the present invention can allow harmonics learning through mutual communication between a user and a system.

In addition, it is possible to generate an evaluation model for harmonics learning through a machine learning method.

In addition, it is possible to provide a systematic learning method by quantitatively quantifying harmonic rules and dividing them hierarchically.

BRIEF DESCRIPTION OF THE SEVERAL VIEWS OF THE DRAWINGS

FIGS. 3, 4, 5 and 6 are diagrams for explaining a scoring model according to an embodiment.

FIGS. 7 to 8 are diagrams for explaining the operation of a control unit according to an embodiment.

DESCRIPTION OF SPECIFIC EMBODIMENTS OF THE INVENTION

Figure 1:
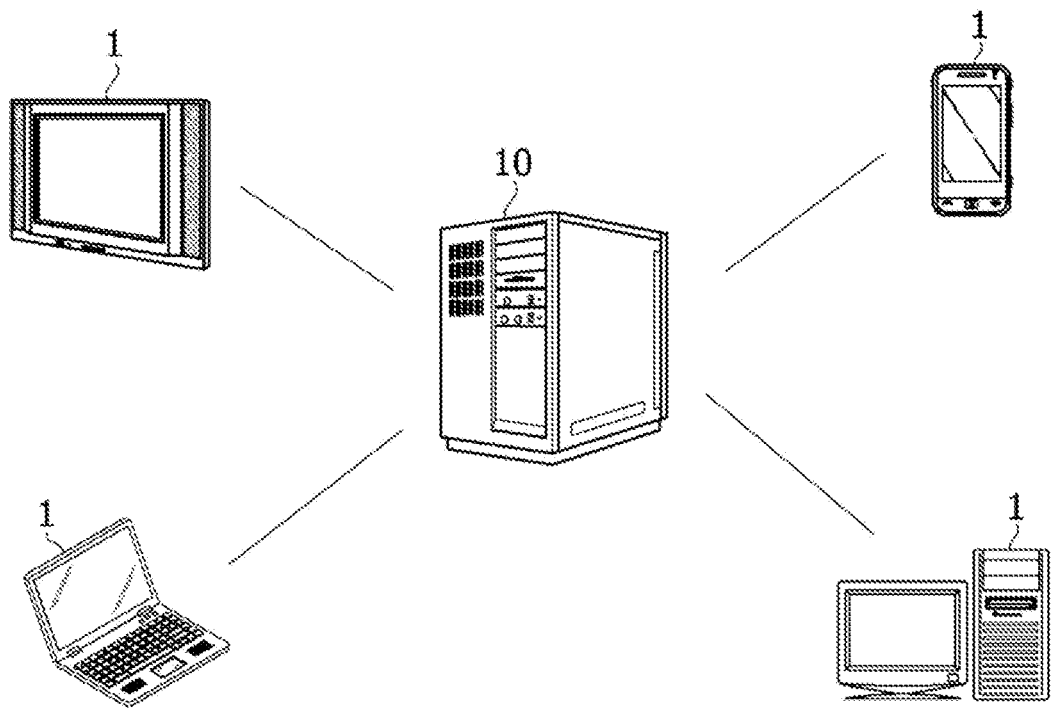
FIG. 1 is a conceptual diagram of a harmonics learning system according to an embodiment.

Hereinafter, preferred embodiments of the present invention will be described in detail with reference to the accompanying drawings.

However, the technical spirit of the present invention is not limited to some embodiments described, but may be implemented in various different forms, and as long as it is within the scope of the technical spirit of the present invention, one or more of the components may be selectively combined and substituted between the embodiments.

In addition, the terms (including technical and scientific terms) used in the embodiments of the present invention may be interpreted as meanings that can be generally understood by those of ordinary skill in the art to which the present invention belongs, unless specifically defined and described explicitly, and commonly used terms, such as terms defined in the dictionary, may be interpreted in consideration of the contextual meaning of the related art.

In addition, the terms used in the embodiments of the present invention are for describing the embodiments and are not intended to limit the present invention.

In the present specification, a singular form may also include a plural form unless otherwise specified in a phrase, and when it is described as "at least one (or one or more) of A and (with) B, C", it may include one or more of all possible combination of A, B, C.

In addition, in describing the components of the embodiment of the present invention, terms such as first, second, A, B, (a), (b), etc. may be used.

These terms are only for distinguishing a component from another component, and are not limited to the essence, order, or sequence of the component by the term.

Further, when it is described that a component is 'connected', 'coupled' or 'contacted' to another component, it may include not only a case where the component is directly connected, coupled or contacted to the other component, but also a case where the component is 'connected', 'coupled' or 'contacted' to the other component by another component between the component and the other component.

In addition, when it is described as being formed or disposed on "upper (above) or lower (below)" of each component, the upper (above) or lower (below) may include not only a case where two components are in direct contact with each other, but also a case where one or more other components are formed or disposed between two components. In addition, when expressed as "upper (above) or lower (below)", the meaning of not only an upper direction but also a lower direction based on one component may be included.

Hereinafter, the embodiment will be described in detail with reference to the accompanying drawings, but the same or corresponding components are assigned the same reference numerals regardless of drawing numerals, and overlapping descriptions thereof will be omitted.

Figure 2:
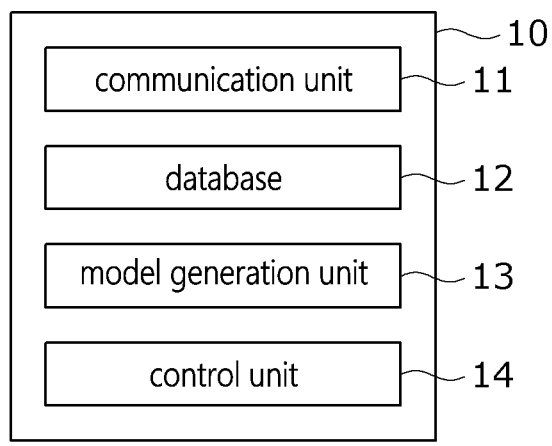
FIG. 2 is a configuration block diagram of a harmonics learning system according to an embodiment.

FIG. 1 is a conceptual diagram of a harmonics learning system according to an embodiment, and FIG. 2 is a configuration block diagram of a harmonics learning system according to an embodiment.

Referring to FIGS. 1 and 2, a user terminal 1 may provide the sheet music of a first voice part online or offline, and may receive the sheet music of a second voice part. In addition, the user terminal may receive scoring result, analysis result, and the like and output it to an outside through a visual means and an auditory means. For the user terminal 1, a mobile terminal such as a smart phone, a tablet PC, a personal digital assistant (PDA), and a portable multimedia player (PMP), as well as a fixed terminal such as a smart TV and a desktop computer may be used. The user terminal 1 receives harmonic sheet music, scoring results, analysis results, and the like from a system 10 through a communication network and displays them, and any user device capable of providing answers, and the like may be employed as the user terminal 1 of the present invention.

The user terminal 1 may include a communication means for performing data communication with the system 10. The user terminal 1 may perform data communication using a long-distance communication technology, for example, Wireless LAN (WLAN), Wi-Fi, Wireless Broadband (Wibro), World Interoperability for Microwave Access (Wimax), High Speed Downlink Packet Access (HSDPA), IEEE 802.16, Long Term Evolution (LTE), Wireless Mobile Broadband Service (WMBS), and the like.

Alternatively, the user terminal 1 may include Bluetooth, Radio Frequency Identification (RFID), Infrared Data Association (IrDA), Ultra Wideband (UWB), ZigBee, Near Field Communication (NFC), and the like. In addition, the user terminal may perform data communication using a short-distance communication technology such as USB communication, Ethernet, serial communication, and an optical/coaxial cable.

The user terminal 1 may include a means for visually displaying the harmonic sheet music, scoring result, and analysis result received from the system 10. The user terminal 1 may include, for example, at least one visual display means among a liquid crystal display (LCD), a thin film transistor liquid crystal display (TFT LCD), an organic light-emitting diode (OLED), a flexible display, a three-dimensional display, and an e-ink display.

Also, the user terminal 1 may include a means for aurally outputting the harmonic sheet music, scoring result, and analysis result received from the system 10. The user terminal 1 may include, for example, an audio output means such as a speaker.

In addition, the user terminal 1 may include a user interface means that receives harmonic sheet music from the user. The user terminal 1 may include, for example, a user interface means such as a key pad, a dome switch, a touch pad, a jog wheel, and a jog switch. Alternatively, when the visual display means and touchpad of the user terminal 1 are composed of a touch screen formed in a layered structure, the visual display means may be used as an input device in addition to an output device.

The harmonics learning system 10 may be configured to include a communication unit 11, a database 12, a model generation unit 13, and a control unit 14.

The communication unit 11 may provide the sheet music of at least one first voice part to the user terminal 1, and may receive from the user terminal the sheet music of at least one second voice part that excludes the first voice part. In an embodiment, the voice part may include soprano, alto, tenor, bass, etc., and the first voice part and the second voice part do not overlap.

In an embodiment, the sheet music of the first voice part is any sheet music generated by the control unit 14, and may include information on tonality, scale, chord, and harmony progression for a specific voice part. For example, the sheet music of the first voice part may be generated with reference to the sheet music stored in the database 12.

In addition, the communication unit 11 may transmit the harmonic scores with the sheet music of the first voice part and the sheet music of the second voice part to the user terminal 1 through the control unit 14.

In an embodiment, the sheet music of the second voice part is the sheet music input by the user through the user terminal 1, and may include information on tonality, scale, chord, and harmony progression for other voice parts except for the first voice part. That is, when the user receives the sheet music of the first voice part through the user terminal 1, the user can input the sheet music of the second voice part corresponding to the first voice part. In addition, the user may perform harmony learning by receiving a harmonics score through the user terminal 1.

The communication unit 11 may provide, for example, a soprano melody as the sheet music of the first voice part, and receive alto, tenor, and bass melodies that are three lower voices as the sheet music of the second voice part.

In addition, the communication unit 11 may provide the soprano and bass melodies as the sheet music of the first voice part, and receive alto and tenor melodies that are inner voices as the sheet music of the second voice part.

In addition, the communication unit 11 may provide the bass melody as the sheet music of the first voice part, and receive the soprano, alto, and tenor melodies which are three upper voices as the sheet music of the second voice part.

The communication unit 11 may perform data communication with the user terminal 1 using a long-distance communication technology such as Wireless LAN (WLAN), Wi-Fi, Wireless Broadband (Wibro), World Interoperability for Microwave Access (Wimax), High Speed Downlink Packet Access (HSDPA), IEEE 802.16, Long Term Evolution (LTE), Wireless Mobile Broadband Service (WMBS).

Alternatively, the communication unit 11 may include Bluetooth, Radio Frequency Identification (RFID), Infrared Data Association (IrDA), Ultra Wideband (UWB), ZigBee, Near Field Communication (NFC), and the like. Also, the communication unit 11 may perform data communication with the user terminal 1 using a short-distance communication technology such as USB communication, Ethernet, serial communication, or an optical/coaxial cable.

The database 12 may include at least one storage medium among a flash memory type memory, a hard disk type memory, a multimedia card micro type memory, a card type memory (e.g., SD or XD memory, etc.), a magnetic memory, a magnetic disk, an optical disk, a random access memory (RAM), a static random access memory (SRAM), a read-only memory (ROM), an electrically erasable programmable read-only memory (EEPROM), a programmable read-only memory (PROM). In addition, the harmonics learning system 10 may operate a web storage that performs a storage function of the database 12 on the Internet, or may operate in connection with the web storage.

The database 12 may store harmonic sheet music, a scoring model, scoring result, and analysis result, and may accumulate and store harmonic sheet music, a scoring model, scoring result, and analysis result for each user for a predetermined period in the past. Here, the harmonics sheet music may be used in the meaning of including the sheet music of the first voice part provided by the harmonics learning system 10, the sheet music of the second voice part provided from the user terminal, and various existing sheet music such as classical music, pop songs, songs, age music, jazz, and chants.

In addition, the database 12 may store data and programs necessary for the harmonics learning system 10 to operate.

In addition, the database 12 may store various graphic user interfaces (GUIs) for visualizing harmonic sheet music, scoring result, and analysis result.

The model generation unit 13 may generate a scoring model by using a plurality of rules divided into a vertical element and a horizontal element.

In an embodiment, the model generation unit may quantitatively quantify the harmonic rules and divide them hierarchically into a vertical element and a horizontal element. In an embodiment, the model generation unit may classify a harmonic element at a specific time point as a vertical element, and classify a harmonic element in which the vertical element visually changes as a horizontal element.

In an embodiment, the vertical element may include at least one of a diapason rule, a position rule, a voice-cross rule, and an overlapping rule.

For example, the diapason rule may be a rule defined as −5 scores for a rest, −10 scores for over diapason, and +0 scores in other cases.

For example, the position rule may be a rule defined as −10 scores when 12 or more chords are placed between alto and tenor, and −10 scores when 12 or more chords are placed between soprano and alto.

For example, the voice-cross rule may be a rule defined as −3 scores when a voice crosses between tenor and bass, −3 scores when a voice crosses between alto and tenor, and −3 scores when a voice crosses between soprano and alto.

For example, the overlapping rule may be a rule defined as −1 score for overlapping soprano and alto, −1 score for overlapping alto and tenor, and −1 score for overlapping tenor and bass.

In an embodiment, the horizontal element may include a common rule, a melody rule. Also, the melody rule may include a stepwise rule, a skip rule, an active-tone rule, and a peak rule.

For example, the common rule may be a rule defined as −3 scores for the same note 4 times in a row and +3 scores for the same note 3 times in a row.

For example, the stepwise rule may be a rule defined as +3 scores when transferring to a nearby note.

For example, the skip rule may be a rule defined as, between consecutive 2nd, +2 scores for 3rd leap, +1 score for 4th leap, +0 scores for 5th leap, −1 score for 6th leap, and −10 scores for 7th leap, −5 scores for octave leap, −10 scores for leap over an octave; between consecutive 3rd, +3 scores for direction change and step progression after 4th leap, +1 score for direction change and step progression after 5th leap, +1 score for direction change and step progression after 6th leap, +1 score for direction change and step progression after octave leap; and impossible for all other cases. In addition, as an exception to the skip rule, there may be a rule defined as −100 scores for augmented 4th leap or augmented 2nd leap, +1 score for consecutive 3rd leap in the same direction after 3rd leap, +0 scores for 4th leap in the same direction after 3rd leap, +0 scores for 3rd leap in the same direction after 4th leap, −100 scores in the case of prohibiting consecutive 4th leap in the same direction as the 4th, and −100 scores in the case of prohibiting again leap in the same direction after 5th leap.

For example, the active-tone rule may a rule defined as, when 'Ti' is a leading tone, +5 scores for a melody in which 'Do' immediately appears, +2 scores when 'Ti' descends to 'La', +50 scores for a context in which the melody of step 7 descends as ^8-^7-^6-^5, −100 scores when 'Ti' leaps to 'Sol', +2 scores when it occurs in inner voice despite leaping from 'Ti' to 'Sol'. In addition, it may be a rule defined as +5 scores when 'Fa' as a sub-dominant goes to 'Mi', +5 scores when 'Fa' ascends in the context of 'Mi'-'Fa'-'Sol', +3 scores when 'Fa' leaps to 'La', −3 scores when leaped 'Fa' ascends to 'Sol', and −100 scores when 'Fa' leaps to 'Ti'.

For example, a peak rule may be defined as +10 scores when the highest score of a melody exists only once within one unit (8 bars), +3 scores when it exists twice, and +3 scores when reaching the highest score in step procession.

In addition, the horizontal element may include a two-part rule applied only between soprano and bass For example, the two-part rule may include a rule defined as +20 scores for 3rd (=10th) preference, +20 scores for 6th (=13th) preference, +3 scores in using perfect 5th interval, +3 scores when perfect 8th is allowed in a contrary motion context, 0 scores when perfect 8th is not used in a contrary motion context, and −20 scores when 2nd, 7th, perfect 4th, augmented 4th (+diminished 5th) appear vertically.

In addition, the two-part rule may include a rule defined as +20 scores for 3rd-3rd, +20 scores for 6th-6th, +20 scores for 3rd-6th, and +20 scores for 6th-3rd, +3 scores for 5-6, 5-3, 5-10, and 5-8, and +3 scores for 8-10, 8-5, and 8-6, for two consecutive chords. Also, the two-part rule may include a rule defined as +3 scores when 3-3-3, i.e., 3rd, is used three times in a row, +3 scores when 6-6-6, i.e., 6th is used three times in a row, +10 scores when 3rd and 6th are used alternately or another note is wrapped in between, such as 3-3-8, 3-8-6, 3-5-3, 3-5-8, 3-6-3, 3-8-5, 6-3-3, 6-3-6, 3-6-6, 6-6-3, 6-8-10, 6-5-10 (horn 5th), 6-4-3, 3-3-6, for 3 consecutive chords.

In addition, the two-part rule may include a rule defined as +20 scores for M3, M10 or M17, +20 scores for P1, P8, or P15, +10 scores for P5, P12 or P19, and −5 scores for the other cases, at the beginning of music.

In addition, the two-part rule may include a rule defined as +3 scores for M3 or M10, +20 scores for P1, P8 or P15, 0 scores for P5, P12 or P19, and −5 scores for the other cases, at the end of music.

In addition, the two-part rule may include a rule defined as −3 scores for contrary motion, +3 scores for oblique motion with the same harmonic background, +3 scores for [linear 5th-6th progression] when oblique motion appears in 5th-6th, −100 scores for parallel 5th or parallel 8th in parallel motion, −3 scores for perfect 5th-diminished 5th in similar motion, +3 scores for the other cases.

FIGS. 3 to 6 are diagrams for explaining a scoring model according to an embodiment.

Referring to FIG. 3, in an embodiment, a scoring model may refer to an evaluation reference table generated by combining a plurality of rules. That is, the evaluation reference table may refer to a table-type model generated by combining a plurality of rules divided according to vertical and horizontal elements.

Referring to FIG. 4, the level of the scoring model may be classified according to the number of included rules. The scoring model may be configured to include at least two rules, and the level may be classified according to the number of included rules. That is, the model generation unit 13 may set the level of the corresponding scoring model higher as the number of included rules is greater, and may set the level of the corresponding scoring model lower as the number of included rules is smaller. Accordingly, the user may perform harmonics learning according to a scoring model of an appropriate level according to the user's harmonics level.

Figure 5:
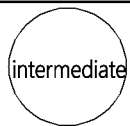

Referring to FIG. 5, the level of the scoring model may be classified according to the difficulty level of the included rule. A difficulty level is set for each rule, and the model generation unit 13 may determine the level of the scoring model according to whether the included rule has a high level of difficulty or a low level of difficulty. In this case, the level of the scoring model may be determined through the average value of the difficulty levels of all the included rules. That is, the model generation unit 13 may set the level of the corresponding scoring model to be higher as the difficulty of the included rule is higher, and may set the level of the corresponding scoring model to be lower as the difficulty of the included rule is lower.

For example, the model generation unit sets the difficulty level to 'low' for the rules related to diatonic harmony. The rules related to chromatic harmony may be set to 'medium' in difficulty, and the rules related to harmony including modulation may be set to 'high' in difficulty.

The model generation unit may generate a scoring model of a specific level by combining only rules having a specific difficulty level, or may generate a scoring model of a specific level by combining rules having various difficulties and through an average value of the difficulty levels.

Also, the level of the scoring model may be classified according to the number and difficulty of included rules.

Through this, the user can perform harmonics learning according to a scoring model of an appropriate level according to his or her level of harmonics.

Also, the model generation unit 13 may generate a scoring model through reinforcement learning using rules. The model generation unit 13 may generate a scoring model by performing repetitive learning so that the sum of the scores given according to the rule is maximized.

Figure 6:
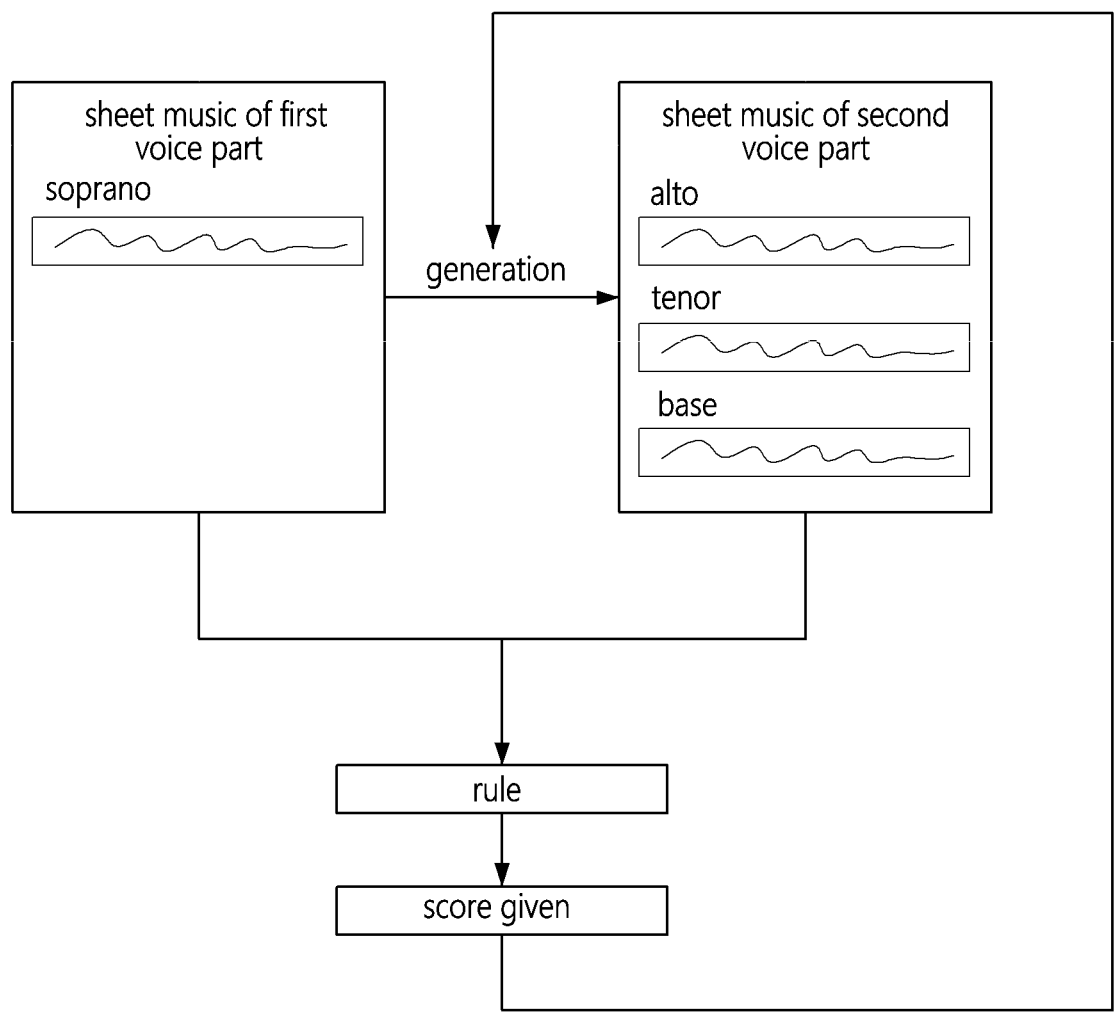

Referring to FIG. 6, the reinforcement learning is to learn which action is optimal to take in a current state, and whenever an action is taken, a reward is granted from the external environment. Learning proceeds in the direction of maximizing this reward.

In an embodiment, the current state may refer to the sheet music of the first voice part, and the action may refer to the sheet music of the second voice part corresponding to the sheet music of the first voice part. Also, the reward may refer to a score given according to a rule. That is, the model generation unit 13 may perform the actions of repeatedly generating the sheet music of the second voice part in response to the sheet music of the first voice part generated by the control unit 14, and evaluating the actions of generating the sheet music of the second voice part according to the rules to grant the reward. The model generation unit 13 may generate a scoring model in which the reward is maximized, that is, the sum total of the scores is maximized, by repeating these actions and reward granting. In this case, the scoring model may refer to the evaluation sheet music generated through the reinforcement learning.

In the reinforcement learning process, the model generation unit 13 may set a scoring model based on a four-voice part and a sixteenth note as a minimum unit of a rhythm. In addition, the pitch value delivered from the sheet music of the second voice part can be inserted one by one into the scoring model in the order of soprano, alto, tenor, and bass. The model generation unit 13 may calculate one reward and transmit it to the scoring model when all four pitch values, i.e., soprano, alto, tenor, and bass, are received. The model generation unit 13 may repeatedly calculate the rewards for as much as the length of the initially set sheet music and transmit it to the scoring model. The model generation unit 13 may continuously adjust the parameters so that the reward is maximized in the parameters of the scoring model by using the current state and the reward.

The harmonic rules are large and complex, so there are disadvantages in that the amount of computation is too large when learning at one time and it takes a long time. Accordingly, the model generation unit may first learn a simple rule and then perform reinforcement learning while adding the rules one by one. In this case, the model generation unit may first learn a rule with low difficulty, and may additionally learn a rule with high difficulty gradually.

When generating a scoring model through the reinforcement learning, the model generation unit 13 may set the level of the scoring model according to at least one of the number and difficulty level of rules to be learned.

That is, the model generation unit 13 may set the level of the corresponding scoring model higher as the number of rules to be learned increases, and may set the level of the corresponding scoring model lower as the number of rules to be learned decreases.

Also, the model generation unit 13 may set the level of the corresponding scoring model higher as the difficulty of the rule to be learned is higher, and may set the level of the corresponding scoring model lower as the difficulty of the rule to be learned is lower. In this case, the level of the scoring model may be determined through the average value of the difficulty of all rules to be learned.

The control unit 14 may mark a harmonic score with the sheet music of the first voice part and the sheet music of the second voice part using the scoring model. The control unit 14 may mark the harmonic score by putting the sheet music of the first voice part and the sheet music of the second voice part into the scoring model.

As for the scoring result, an incorrect part or a deducted part may be displayed on the sheet music of the second voice part input by the user. In addition, the scoring result may be provided as a quantitative value.

Figure 8:
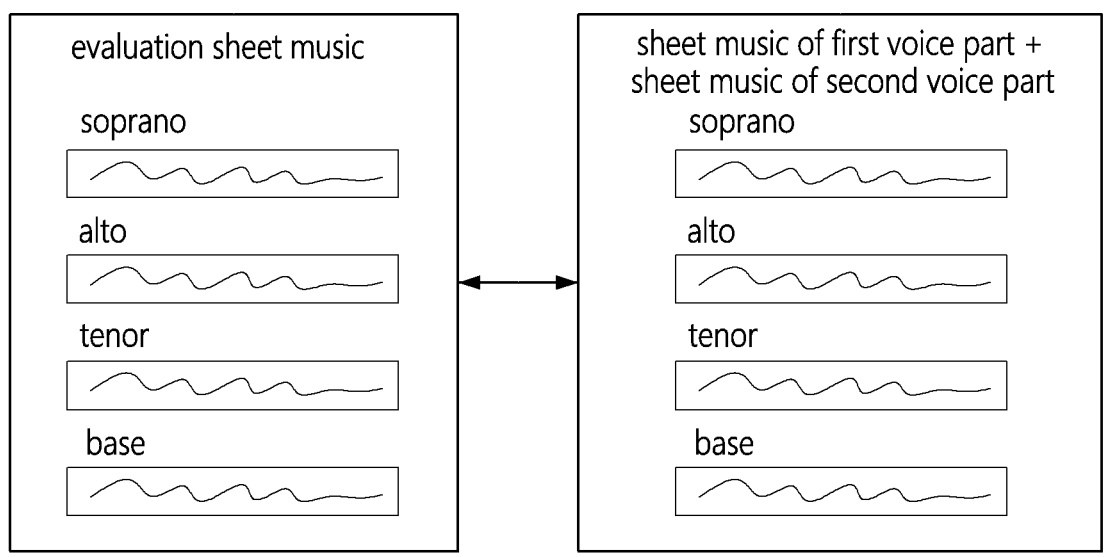

FIGS. 7 to 8 are diagrams for explaining the operation of a control unit according to the embodiment.

Referring to FIG. 7, when the scoring model generated by the model generation unit 13 is an evaluation reference table, the control unit 14 combines the sheet music of the first voice part and the sheet music of the second voice part, and evaluates whether the sheet music of the second voice part meets the evaluation reference table to give a harmonics score.

Referring to FIG. 8, when the scoring model generated by the model generation unit 13 is the evaluation sheet music, the control unit 14 combines the sheet music of the first voice part and the sheet music of the second voice part and compares it with the evaluation sheet music, so that the harmonic score can be given according to the degree of similarity.

Figure 9:
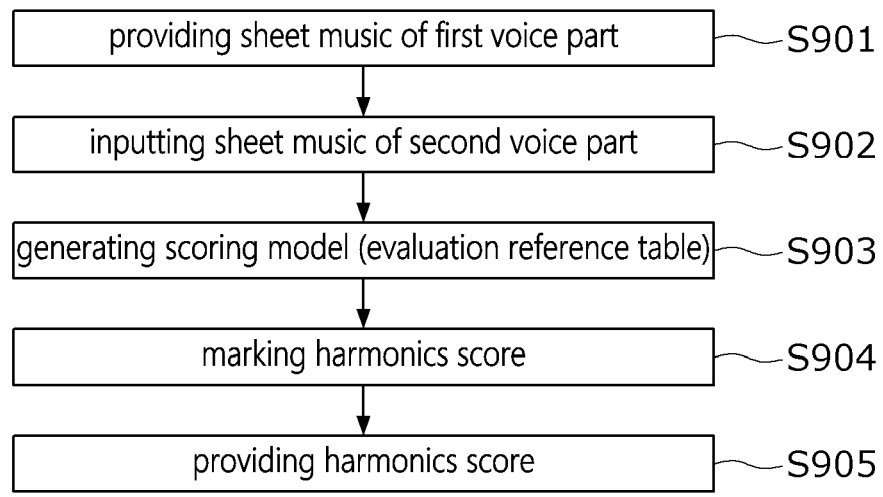
FIGS. 9 to 10 are flowcharts of a harmonics learning method according to an embodiment.

FIG. 9 is a flowchart of a harmonics learning method according to an embodiment.

Referring to FIG. 9, first, the sheet music of at least one first voice part is provided from the harmonics learning system to the user terminal. The sheet music of the first voice part is any sheet music generated by the control unit, and may include information on tonality, scale, chord, and harmony progression for a specific voice part. For example, the sheet music of the first voice part may be generated with reference to the sheet music stored in the database (S901).

Then, the sheet music of at least one second voice part excluding the first voice part is input from the user terminal to the harmonics learning system. When the user is provided with the sheet music of the first voice part through the user terminal, the user can input the sheet music of the second voice part corresponding to the first voice part. The sheet music of the second voice part is the sheet music input by the user through the user terminal, and may include information on tonality, scale, chord, and harmony progression for voice parts other than the first voice part (S902).

Then, the harmonics learning system generates a scoring model using a plurality of rules divided into vertical and horizontal elements. In an embodiment, the scoring model may refer to an evaluation reference table generated by combining a plurality of rules. That is, the evaluation reference table may refer to a table-type model generated by combining the plurality of rules divided according to vertical and horizontal elements (S903).

Then, the harmonics learning system marks the harmonics scores with the sheet music of the first voice part and the sheet music of the second voice part using the scoring model. In this case, the harmonics learning system may combine the sheet music of the first voice part and the sheet music of the second voice part, evaluate whether the sheet music of the second voice part meets an evaluation reference table, and give the harmonics score (S904).

Then, the harmonics learning system provides the harmonics score to the user terminal. In this case, the harmonics learning system may provide the evaluation reference table together to the user terminal (S905).

Figure 10:
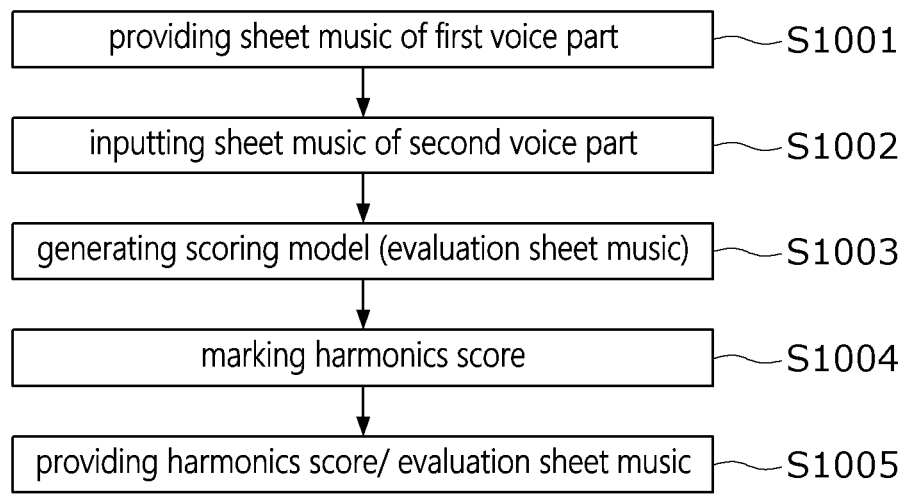

FIG. 10 is a flowchart of a harmonics learning method according to an embodiment.

Referring to FIG. 10, first, the sheet music of at least one first voice part is provided from the harmonics learning system to the user terminal. The sheet music of the first voice part is an arbitrary sheet music generated by the harmonics learning system, and may include information on tonality, scale, chord, and harmony progression for a specific voice part (S1001).

Then, the sheet music of at least one second voice part excluding the first voice part is input from the user terminal to the harmonics learning system. When the user receives the sheet music of the first voice part through the user terminal, the user can input the sheet music of the second voice part corresponding to the first voice part. The sheet music of the second voice part is the sheet music input by the user through the user terminal, and may include information on tonality, scale, chord, and harmonic progression for voice parts other than the first voice part (S1002).

Then, the harmonics learning system generates a scoring model using a plurality of rules divided into vertical and horizontal elements. The harmonics learning system may generate a scoring model through reinforcement learning using rules. The harmonics learning system may generate a scoring model by performing repetitive learning so that the total sum of the scores given according to the rule is maximized. In this case, the scoring model may refer to the evaluation sheet music generated through the reinforcement learning (S1003).

Then, the harmonics learning system marks the harmonics score with the sheet music of the first voice part and the sheet music of the second voice part using the scoring model. In this case, the harmonics learning system may give the harmonics score by combining the sheet music of the first voice part and the sheet music of the second voice part and comparing it with an evaluation sheet music (S1004).

Then, the harmonics learning system provides the harmonics score to the user terminal. In this case, the harmonics learning system may provide the evaluation sheet music together to the user terminal (S1005).

The term 'unit' as used in the present embodiment means software or a hardware component, such as a field programmable gate array (FPGA) or ASIC, and the 'unit' performs specific tasks. However, the 'unit' is not limited to software or hardware. The "unit" may be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and 'units' may be combined with fewer components and "units" or may be further separated into additional components and 'units'. Further-more, the components and 'units' may be implemented to operation on one or more CPUs within a device or a security multimedia card.

Although the above has been described with reference to preferred embodiments of the present invention, it will be understood by those skilled in the art that the present invention may be variously modified and changed without departing from the spirit and scope of the present invention as set forth in the claims below.

What is claimed is:

1. A harmonics learning system, comprising:
   a communication unit that provides a user terminal with sheet music of at least one first voice part, and receives from the user terminal sheet music of at least one second voice part that excludes the first voice part;
   a model generation unit that generates a scoring model by using a plurality of rules divided into a vertical element and a horizontal element; and
   a control unit that marks a harmonic score with the sheet music of the first voice part and the sheet music of the second voice part by using the scoring model.

2. The system according to claim 1, wherein level of the scoring model is classified according to a number of included rules.

3. The system according to claim 1, wherein the vertical element includes at least one of a diapason rule, a position rule, a voice-cross rule, and an overlapping rule.

4. The system according to claim 1, wherein the horizontal element includes a common rule and a melody rule, the melody rule includes at least one of a stepwise rule, a skip rule, an active-tone rule, and a peak rule.

5. The system according to claim 1, wherein the model generation unit generates the scoring model through reinforcement learning using the rules.

6. The system according to claim 5, wherein the model generation unit generates the scoring model by performing repetitive learning so that a total sum of scores given according to the rules is a maximum.

7. A method for learning harmonics, comprising the steps of:
   providing, by a communication unit, sheet music of at least one first voice part to a user terminal;
   receiving, by the communication unit, sheet music of at least one second voice part that excludes the first voice part from the user terminal;
   generating a scoring model by using a plurality of rules divided into a vertical element and a horizontal element by a model generation unit; and
   marking a harmonic score with the sheet music of the first voice part and the sheet music of the second voice part by using the scoring model.

8. The method according to claim 7, wherein in the step of generating the scoring model, the scoring model is generated through reinforcement learning using the rules.

9. The method according to claim 8, wherein in the step of generating the scoring model, the scoring model is generated by performing repetitive learning so that a total sum of scores given according to the rules is a maximum.

* * * * *